United States Patent [19]

Williams

[11] Patent Number: 4,566,429
[45] Date of Patent: Jan. 28, 1986

[54] COOKING GRID

[76] Inventor: Leonard E. Williams, P.O. Box 15448, Fort Worth, Tex. 76119

[21] Appl. No.: 761,350

[22] Filed: Jul. 31, 1985

Related U.S. Application Data

[63] Continuation of Ser. No. 637,017, Aug. 2, 1984, abandoned.

[51] Int. Cl.⁴ .......................... F24C 15/00; A47J 27/00
[52] U.S. Cl. .......................................... 126/14; 99/450; 126/29
[58] Field of Search ................. 99/467, 444, 445, 446, 99/424, 349, 422; 126/215, 390, 59.5; 220/44

[56] References Cited

U.S. PATENT DOCUMENTS

| | | | |
|---|---|---|---|
| 1,421,393 | 7/1922 | Boyle | 126/29 |
| 1,436,937 | 11/1922 | Boyle | 126/99 |
| 1,454,385 | 5/1923 | Higham | 126/29 |
| 1,709,289 | 4/1929 | Tatum . | |
| 2,631,579 | 3/1953 | Metzger | 126/29 |
| 2,800,071 | 7/1957 | Begalka | 99/339 |
| 3,288,050 | 11/1966 | Saiki | 99/447 |
| 3,364,913 | 1/1968 | Borglum | 126/25 |
| 3,552,302 | 1/1971 | Gilberg | 99/444 |
| 3,722,409 | 3/1973 | Plumley | 99/467 |
| 3,777,653 | 12/1973 | Carruth | 99/422 |
| 4,108,141 | 8/1978 | Bauer | 99/422 |

Primary Examiner—William E. Lyddane
Assistant Examiner—Gerald A. Anderson
Attorney, Agent, or Firm—James E. Bradley

[57] ABSTRACT

A cooking grid for a barbecue grill has a grid portion for cooking steaks and a griddle portion for cooking hamburger patties and small food products. The cooking grid is a cast metal member with the grid and griddle portions integrally formed therein. The grid portion has large rectangular openings and high porosity. The griddle portion consists of a section of support metal containing a plurality of smaller apertures, preferably circular, and having a lower porosity.

5 Claims, 2 Drawing Figures

COOKING GRID

This is a continuation of application Ser. No. 637,017, filed Aug. 2, 1984, now abandoned.

BACKGROUND OF THE INVENTION

1. Field of the Invention

This invention relates in general to grids for cooking grills for cooking food products using heat and smoke, particularly for an outdoor cooking grill.

2. Description of the Prior Art

A typical outdoor cooking grill, often called a barbecue grill, has a receptacle or box for containing a heat source. The heat source might be a gas flame, electric burners, or actual charcoal. If gas or electric, the heat source will normally be located below a layer of rocks which are heated by the heat source. The grill has means for supporting a grid above the heat source. The food product being cooked will drip juice and grease, causing smoke to evolve to provide flavoring and seasoning. If charcoal is used, the juice will drop directly onto the charcoal. If a layer of rocks is used, the juice drips onto the hot rocks to cause smoke to evolve.

The grid has rectangular openings for the passage of heat and smoke. Some grids are made of cast metal while others are made of wire. The openings normally are fairly large so that as much as possible of the food product is exposed to smoke and cooked directly by convection heat of the heat source, not by conduction heat from the heat of the grid.

While this is suitable for certain food products, particularly steaks, the large rectangular openings cause problems with other food products. When cooking hamburger patties, the patty tends to soften and portions may extend down into the openings. This makes it difficult to turn the patties over for cooking on the other side. The patty may tear and portions of the meat may fall through the opening. Smaller food products, such as vegetables and small pieces of meat, chicken or fish, may likely slip through the openings in the grid.

There are various proposals in the patented art to remedy the drawbacks to cooking grids when used for cooking hamburger patties, vegetables and other small food products. Generally, these proposals involve the use of a separate griddle which is placed on top of a conventional grid of a cooking grill. The griddle normally has a large surface area for cooking by heat conduction, and small apertures allow the passage of smoke. Examples of these griddles are shown in U.S. Pat. No. 3,552,302, Gilberg, Jan. 5, 1971, and U.S. Pat. No. 3,722,402, Plumley, Mar. 27, 1973. A separate griddle requires additional efforts in cleaning and storing. Another patented proposal, shown in U.S. Pat. No. 3,364,913, Borglum, Jan. 23, 1968, shows a flat griddle section 47 formed with a cooking grid, however, griddle 47 suffers from deficiencies such as lacking means for smoke to pass through and juice to drop from the food products.

SUMMARY OF THE INVENTION

An improved cooking grid for use with a barbecue or cooking grill is provided. The cooking grid comprises a cast metal member having integrally formed therein a grid portion and a griddle portion. The grid portion of the grid has a plurality of rectangular openings dimensioned conventionally for the cooking of food products such as steaks. These openings are large and allow passage of heat and smoke for cooking the steak in a normal manner.

The griddle portion, on the other hand, has apertures that are much smaller than the openings in the grid portion. These apertures allow the passage of the heat and smoke for seasoning hamburger patties and smaller food products. The support metal in the griddle portion is relatively large to provide adequate support and also some cooking by conduction of heat from the support metal to the food product.

DESCRIPTION OF THE PREFERRED EMBODIMENT

Figure 1:
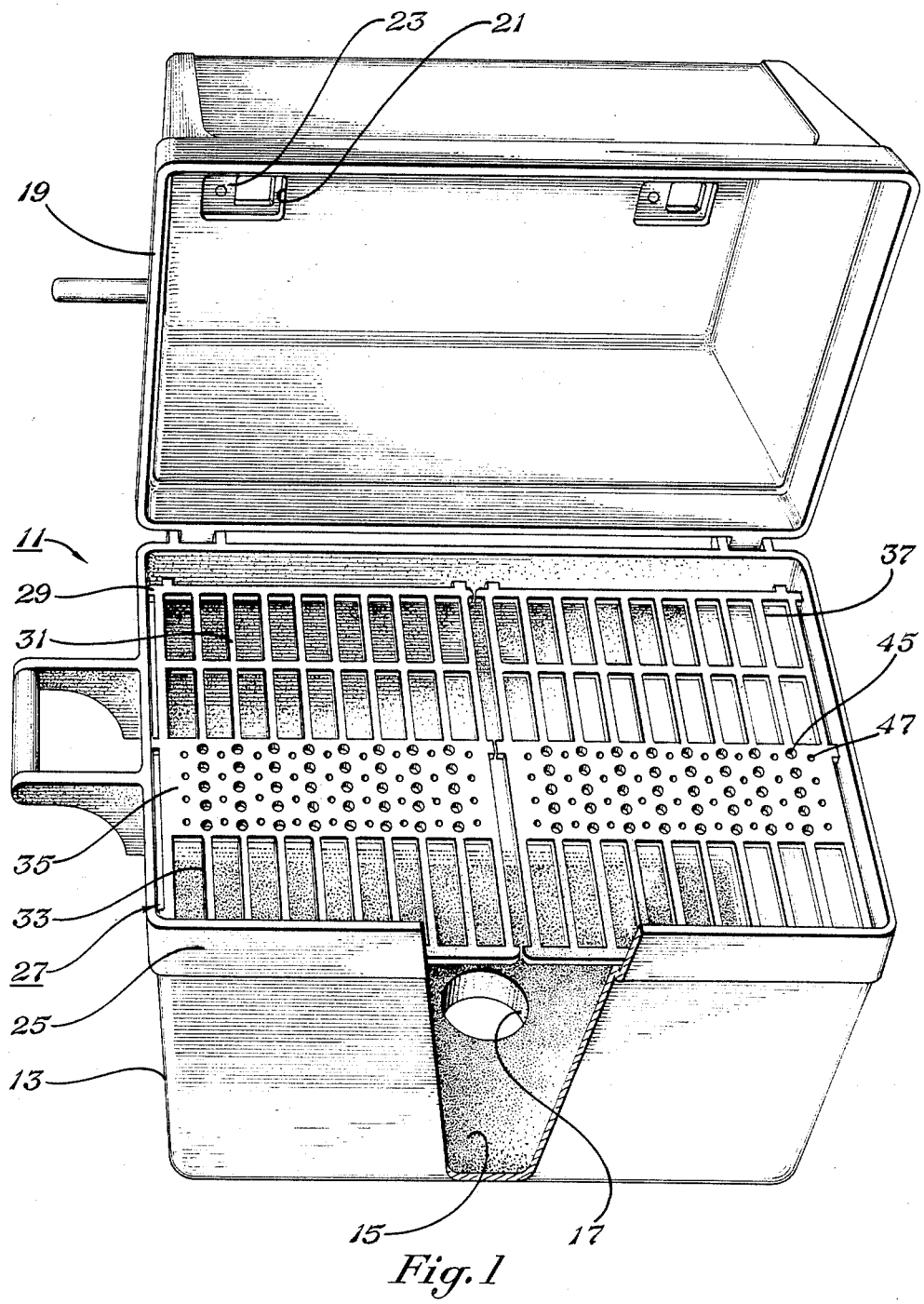
FIG. 1 is a perspective view of an outdoor cooking grill, shown with portions broken away to reveal the interior, and having grids constructed in accordance with this invention.

Referring to FIG. 1, barbecue grill 11 is of a conventional design in that it has a receptacle 13 of metal for holding a heat source. The receptacle 13 has a bottom 15 and in the embodiment shown, a hole 17. A mounting post will be secured in hole 17. The grill body or receptacle 13 in the embodiment shown will hold charcoal, (not shown) or an electric element or gas burner (not shown) could be located above bottom 15. A lid 19 is secured by hinges to the receptacle 13. Lid 19 will close over receptacle 13. Ports 21, having sliding closures 23, allow smoke to escape at a variable amount.

The grill 11 has support means, which in FIG. 1, comprises a lip 25, for supporting two grids 27. The lip 25 is located at the upper edge of receptacle 13 and provides an upwardly facing shoulder at the front and the back of receptacle 13 for the grids 27 to rest thereon. A portion of the wall of the receptacle 13 is broken out in FIG. 1 to display the interior of lip 25.

The grids 27 are identical to each other, each having tabs 29 spaced around the perimeter or edges of the grid 27 to rest on the lip 25. Each grid 27 has two grid portions 31 and 33 which are separated by a griddle portion 35. The grid portions 31 and 33 are particularly used for cooking steaks, while the griddle portion 35 is particularly used for cooking hamburger patties or small food products such as vegetables. The grids 27 may be flat, slightly concave or stepped or other shapes.

Figure 2:
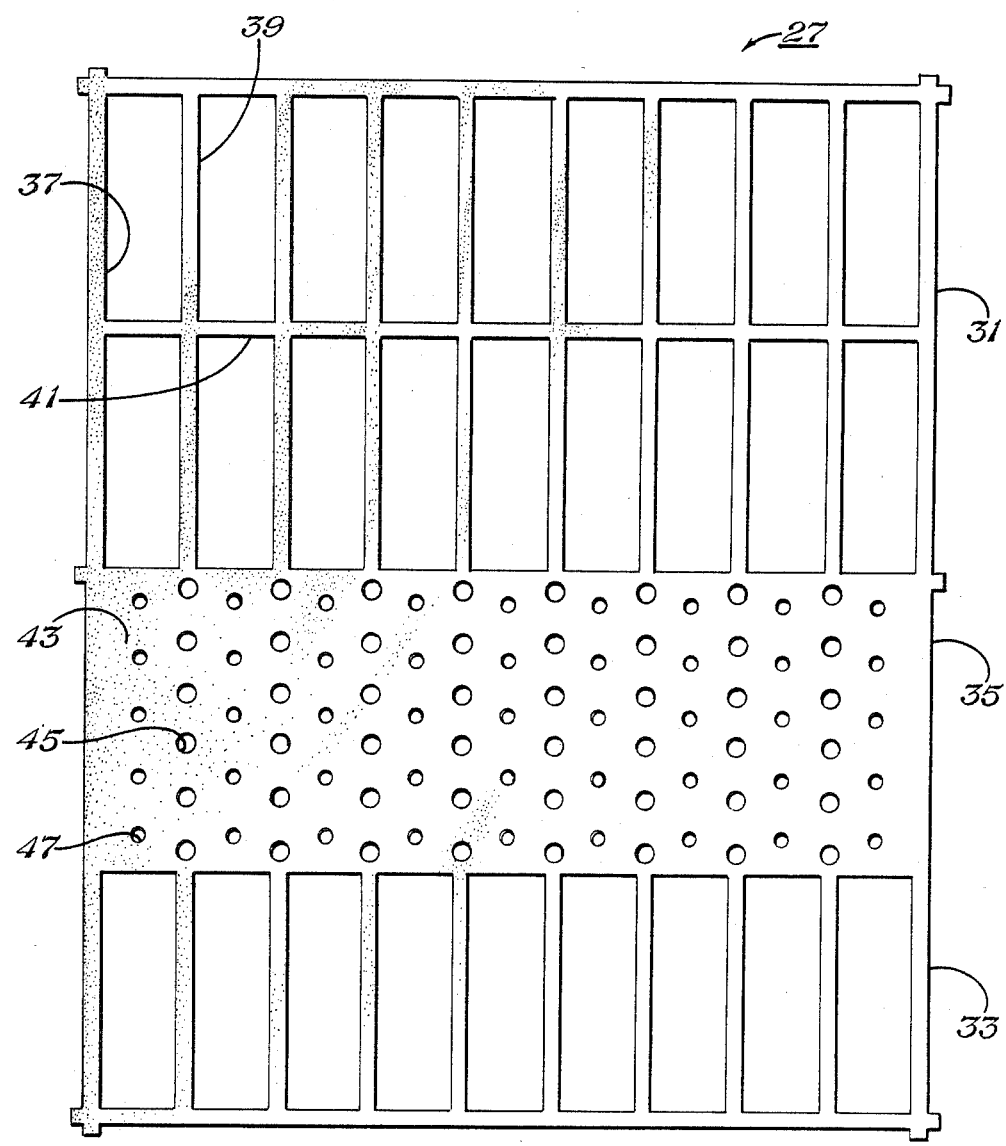
FIG. 2 is an enlarged top view of one of the grids of FIG. 1.

Referring to FIG. 2, each grid portion 31 and 33 has a plurality of elongated rectangular apertures 37. Apertures 37 are separated from each other by metal support strips 39 and 41. The support strips 39 and 41 are uniformly spaced to provide apertures 37 of identical dimension. The grid portion 31 has two separate rows of apertures 37, while the grid portion 33 has a single row of apertures 37 of the same size. Apertures 37 are dimensioned in a range normally used in conventional cooking grids for cooking steaks.

The griddle portion 35 has a substantially flat rectangular section of support metal 43. In the grill industry, the distance from the left side of grill 11 to the right side, as shown in the drawings, is considered the length. The distance from the front to the back is called the width. Griddle portion 35 thus extends across the full length of grid 27, and its width is about 20 to 30% of the width of grid 27. The support metal 43 has a smooth upper surface located in a single plane that also includes the upper surfaces of the support strips 39 and 41. A plurality of apertures 45 and 47 are formed in the support metal 43. Each aperture 45 is the same in diameter and is located in a row that is in alignment with the strips 39 of the grid portions 31 and 33. Each aperture 47 is the same in diameter and smaller in diameter than apertures 45. The rows of apertures 47 are located between the rows of apertures 45 and offset. The rows of apertures 47 are located between two of the strips 39. The rows of apertures 45 and 47 are parallel with each other and with support strips 39.

The area of each aperture 45 and 47 is greatly smaller than the area of each opening 37. The total area of the apertures 45 and 47 is much less than the total areas of the apertures 37 in grid portion 33. Also, the total area of all the apertures 45 and 47 in relation to the total area of the grid portion 35, called "porosity" herein, is much less than the total area of apertures 37 relative to the total area of the grid portions 31 and 33. This results in an area in the griddle portion 35 that will more easily support hamburger patties and small food products such as vegetables.

In the preferred embodiment apertures 45 have a diameter of 9/16 inch and apertures 47 have a diameter of ¼ inch. The porosity of griddle portion 35 is preferably 18 to 20%. This results in more support metal 43 than the free space of apertures 45 and 47, since the support metal 43 comprise 80 to 82% of the griddle portion 35. The strips 39 and 41 are preferably ¼ inch wide and spaced ½ inch apart. The porosity of grid portions 31 and 33 is preferably at least 57%. This results in less support metal through strips 39 and 41 than the free space of apertures 37, since the support metal comprises only 43% or less of the grid portions 31 and 33.

In operation, for cooking steaks, a user would use primarily the grid portions 31 and 33, but he can also use the griddle portion 35, or overlap to some extent. For cooking hamburger patties and small food products, the user would put the patties on the griddle portions 35. Juice from the food drips through apertures 45 and 47 and smoke rises through apertures 45 and 47.

While the invention has been shown in only one of its forms, it should be apparent to those skilled in the art that it is not so limited but is susceptible to various changes without departing from the scope of the invention.

I claim:

1. An improved cooking grid for use with a cooking grill having a receptacle for containing a heat source for providing heat and smoke, and support means for engaging edges of the grid to support the grid above the heat source, the grill being of the type having two grids located side-by-side, each grid comprising in combination:

a rectangular cast metal member having integrally formed therein a grid portion and a griddle portion, both located substantially in the same plane;

the grid portion being two rectangular sections located on the front and back of the grid separated by the griddle portion, which is also rectangular, the grid and griddle portions each having a length from one side to the other side that is the same as the grid, one of the grid sections having a width measured from front to back that is greater than the widths of the other grid section and the griddle portion, the griddle portion having a width that is about 20% to 30% the width of the grid, measured front to back;

the grid portion having in each grid section a plurality of rectangular elongated openings separated by support metal, defining rows of openings extending across the length of the grid from one side to the other side, the openings having a total surface area greater than the total surface area of the support metal of the grid portion; the grid section the larger width having more rows of openings than the grid section having the smaller width;

the griddle portion having a plurality of circular apertures separated by support metal, the apertures having a total surface area that is less than the total surface area of the support metal of the griddle portion.

2. An improved cooking grid for use with a cooking grill having a receptacle for containing a heat source for providing heat and smoke, and support means for engaging edges of the grid to support the grid above the heat source, the grill being of the type having two grids located side-by-side, each grid comprising in combination:

a rectangular cast metal member having integrally formed therein a grid portion and a griddle portion, both located substantially in the same plane;

the grid portion being in two rectangular sections separated by the griddle portion, which is also rectangular, the grid and griddle portions each extending from one side of the grid to the other side one of the grid sections having a width measured from front to back that is greater than the widths of the other grid section and griddle portion, the griddle portion having a width that is about 20% to 30% the width of the grid, measured front to back;

the grid portion having a plurality of rectangular elongated openings separated by support metal for cooking food products such as steaks, defining rows of openings extending across the length of the grid from one side to the other side, with the grid section with the larger width having more rows of openings than the grid section having the smaller width;

the griddle portion having a plurality of circular apertures formed in support metal, the porosity of the griddle portion being less than the porosity of the grid portion for cooking food products that would tend to fall through the openings of the grid portion;

the porosity of the grid portion being at least about 57%;

the porosity of the griddle portion being about 18% to 20%.

3. The cooking grid according to claim 2 wherein the apertures of the grid portion comprise rows of larger diameter apertures alternating with rows of smaller diameter apertures.

4. The cooking grid according to claim 2 wherein the openings in the grid sections each have substantially the same length and width.

5. The cooking grid according to claim 2 wherein there are two rows of openings in the grid section which has the larger width and a single row of openings in the grid section which has the smaller width, all of the openings in the grid sections having substantially the same length and width.

* * * * *